US010493622B2

(12) United States Patent
Sweeney et al.

(10) Patent No.: US 10,493,622 B2
(45) Date of Patent: Dec. 3, 2019

(54) SYSTEMS AND METHODS FOR COMMUNICATING FUTURE VEHICLE ACTIONS TO BE PERFORMED BY AN AUTONOMOUS VEHICLE

(71) Applicant: UATC, LLC, San Francisco, CA (US)

(72) Inventors: Matthew Sweeney, Pittsburgh, PA (US); Brian Cullinane, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 35 days.

(21) Appl. No.: 15/650,004

(22) Filed: Jul. 14, 2017

(65) Prior Publication Data

US 2019/0015976 A1 Jan. 17, 2019

(51) Int. Cl.
*B25J 9/16* (2006.01)
*G05D 1/02* (2006.01)
(Continued)

(52) U.S. Cl.
CPC ............. *B25J 9/1602* (2013.01); *B60Q 1/50* (2013.01); *G01C 21/3632* (2013.01); *G01C 21/3676* (2013.01); *G05D 1/0016* (2013.01); *G05D 1/0214* (2013.01); *G05D 1/0242* (2013.01); *G05D 1/0246* (2013.01); *B60W 2550/402* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS 6,339,745 B1 1/2002 Novik
6,424,638 B1 7/2002 Ray
(Continued)

FOREIGN PATENT DOCUMENTS

DE 10118188 10/2002
EP 2709207 3/2014

OTHER PUBLICATIONS

Jennifer J.N.Liu, et al., "Mobile Ad Hoc Networking with a View of 4G Wireless: Imperatives and Challenges", In: Mabie Ad Hoc Networking, 2004 Institute of Electrical and Electronics Engineers, Inc. Jan. 28, 2005, Section 1 .2.

*Primary Examiner* — Richard M Camby
(74) *Attorney, Agent, or Firm* — Dority & Manning, PA

(57) ABSTRACT

Systems and methods for communicating future autonomous vehicle actions are provided. In one example embodiment, a computer implemented method includes obtaining, by a computing system including one or more computing devices onboard an autonomous vehicle, data associated with a planned motion of the autonomous vehicle. The method includes identifying, by the computing system, a future vehicle action to be performed by the autonomous vehicle based at least in part on the data associated with the planned motion. The method includes determining, by the computing system, an external vehicle indication that is indicative of the future vehicle action to be performed by the autonomous vehicle. The method includes outputting, by the computing system via an output device onboard the autonomous vehicle, the external vehicle indication. The external vehicle indication is outputted to at least a portion of a surrounding environment of the autonomous vehicle.

19 Claims, 9 Drawing Sheets

(51) Int. Cl.
    *G01C 21/36* (2006.01)
    *G05D 1/00* (2006.01)
    *B60Q 1/50* (2006.01)

(56) References Cited

U.S. PATENT DOCUMENTS

| | | |
|---|---|---|
| 7,095,318 B1 | 8/2006 | Bekhor |
| 7,889,065 B2 | 2/2011 | Smith |
| 7,904,092 B2 | 3/2011 | Hart |
| 8,155,081 B1 | 4/2012 | Mater |
| 8,417,239 B1 | 4/2013 | DeCusatis |
| 8,437,890 B2 | 5/2013 | Anderson |
| 8,452,310 B1 | 5/2013 | Orlik |
| 8,676,431 B1 | 3/2014 | Mariet |
| 8,818,719 B1 | 8/2014 | Thanayankizil |
| 8,880,273 B1 | 11/2014 | Chatham |
| 8,954,252 B1 | 2/2015 | Urmson |
| 9,014,905 B1 | 4/2015 | Whitehill |
| 9,025,463 B1 | 5/2015 | Mankee |
| 9,057,620 B2 | 6/2015 | Dave |
| 9,087,348 B2 | 7/2015 | Petrucci |
| 9,107,132 B2 | 8/2015 | Kowshik |
| 9,432,929 B1 | 8/2016 | Ross |
| 9,441,975 B2 | 9/2016 | Pylappan |
| 9,467,832 B2 | 10/2016 | Haney |
| 9,475,422 B2 | 10/2016 | Hillis |
| 9,481,367 B1 | 11/2016 | Gordon |
| 9,483,948 B1 | 11/2016 | Gordon |
| 9,488,490 B2 | 11/2016 | Chintakindi |
| 9,537,561 B1 | 1/2017 | Kotecha |
| 9,557,183 B1 | 1/2017 | Ross |
| 9,565,625 B1 | 2/2017 | MacNeille |
| 9,603,158 B1 | 3/2017 | Ross |
| 9,632,502 B1 * | 4/2017 | Levinson .............. G01S 17/875 |
| 10,053,001 B1 * | 8/2018 | Nabbe .................. B60Q 1/346 |
| 2002/0029108 A1 | 3/2002 | Liu |
| 2003/0073442 A1 | 4/2003 | Fattouch |
| 2005/0090226 A1 | 4/2005 | Wolf |
| 2005/0168353 A1 | 8/2005 | Dement |
| 2005/0171654 A1 | 8/2005 | Nichols |
| 2006/0059024 A1 | 3/2006 | Bailey |
| 2006/0189353 A1 | 8/2006 | Fujishima |
| 2006/0189533 A1 | 8/2006 | Fujishima |
| 2006/0229070 A1 | 10/2006 | de La Chapelle |
| 2006/0229103 A1 | 10/2006 | Monk |
| 2006/0229104 A1 | 10/2006 | de La Chapelle |
| 2007/0077945 A1 | 4/2007 | Sheynblat |
| 2007/0178911 A1 | 8/2007 | Baumeister |
| 2008/0097688 A1 | 4/2008 | Tashev |
| 2008/0186882 A1 | 8/2008 | Scherzer |
| 2008/0242305 A1 | 10/2008 | Kahlert |
| 2009/0005097 A1 | 1/2009 | Shaffer |
| 2009/0109061 A1 | 4/2009 | McNew et al. |
| 2009/0196234 A1 | 8/2009 | Greene |
| 2009/0196258 A1 | 8/2009 | Escobar Sanz |
| 2009/0254254 A1 | 10/2009 | Wang |
| 2010/0082193 A1 | 4/2010 | Chiappetta |
| 2010/0151865 A1 | 6/2010 | Camp, Jr. |
| 2010/0290359 A1 | 11/2010 | Dewey |
| 2011/0128161 A1 | 6/2011 | Bae et al. |
| 2011/0171960 A1 | 7/2011 | Hershey |
| 2011/0227757 A1 | 9/2011 | Chen |
| 2013/0073327 A1 | 3/2013 | Edelberg |
| 2013/0115956 A1 | 5/2013 | Ewert |
| 2013/0122934 A1 | 5/2013 | Branch |
| 2013/0142035 A1 | 6/2013 | Sunderrajan |
| 2013/0182575 A1 | 7/2013 | McLean |
| 2013/0184985 A1 | 7/2013 | Bollars |
| 2013/0218469 A1 | 8/2013 | Turton |
| 2013/0225229 A1 | 8/2013 | Al-Shalash |
| 2013/0279349 A1 | 10/2013 | Pandey |
| 2013/0322388 A1 | 12/2013 | Ahn |
| 2014/0087739 A1 | 3/2014 | Weaver |
| 2014/0180501 A1 | 6/2014 | Kyllmann |
| 2014/0188377 A1 | 7/2014 | Bonawitz |
| 2014/0297116 A1 | 10/2014 | Anderson |
| 2014/0306833 A1 | 10/2014 | Ricci |
| 2014/0309789 A1 | 10/2014 | Ricci |
| 2014/0309814 A1 | 10/2014 | Ricci |
| 2014/0309856 A1 * | 10/2014 | Willson-Quayle ..... B60Q 1/444 701/36 |
| 2014/0309864 A1 | 10/2014 | Ricci |
| 2014/0355476 A1 | 12/2014 | Anderson |
| 2015/0023256 A1 | 1/2015 | Liu |
| 2015/0063144 A1 | 3/2015 | Kozat |
| 2015/0081212 A1 | 3/2015 | Mitchell |
| 2015/0133167 A1 | 5/2015 | Edge |
| 2015/0149078 A1 | 5/2015 | Profous |
| 2015/0215738 A1 | 7/2015 | Frusina |
| 2015/0222372 A1 | 8/2015 | LeGrand |
| 2015/0264519 A1 | 9/2015 | Mirzaei |
| 2015/0281906 A1 | 10/2015 | Tseng |
| 2015/0308841 A1 | 10/2015 | Matsunaga |
| 2015/0331111 A1 | 11/2015 | Newman |
| 2015/0338849 A1 * | 11/2015 | Nemec ................. G05D 1/0055 701/25 |
| 2015/0339928 A1 | 11/2015 | Ramanujam |
| 2016/0006723 A1 | 1/2016 | Wilson |
| 2016/0073117 A1 | 3/2016 | Grasmug |
| 2016/0157254 A1 | 6/2016 | Novlan |
| 2016/0282468 A1 | 9/2016 | Gruver |
| 2016/0301698 A1 | 10/2016 | Katara |
| 2016/0323356 A1 | 11/2016 | Ribeiro |
| 2016/0337935 A1 | 11/2016 | Patil |
| 2017/0120804 A1 | 5/2017 | Kentley |
| 2017/0132334 A1 | 5/2017 | Levinson |
| 2017/0268888 A1 | 9/2017 | Blumenberg |
| 2017/0364080 A1 * | 12/2017 | Chintakindi ............ B60T 7/18 |
| 2018/0284266 A1 * | 10/2018 | Talamonti ......... B62D 15/0255 |
| 2018/0284780 A1 * | 10/2018 | McWhirter ............ G05D 1/024 |
| 2018/0348751 A1 * | 12/2018 | Newman ............ G05D 1/0055 |

* cited by examiner

SYSTEMS AND METHODS FOR COMMUNICATING FUTURE VEHICLE ACTIONS TO BE PERFORMED BY AN AUTONOMOUS VEHICLE

FIELD

The present disclosure relates generally to communicating future vehicle actions to be performed by an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for communicating future autonomous vehicle actions. The method includes obtaining, by a computing system including one or more computing devices onboard an autonomous vehicle, data associated with a planned motion of the autonomous vehicle. The method includes identifying, by the computing system, a future vehicle action to be performed by the autonomous vehicle based at least in part on the data associated with the planned motion. The method includes determining, by the computing system, an external vehicle indication that is indicative of the future vehicle action to be performed by the autonomous vehicle. The external vehicle indication is indicative of a type of the future vehicle action to be performed by the autonomous vehicle and a timing associated with the future vehicle action. The method includes outputting, by the computing system via an output device onboard the autonomous vehicle, the external vehicle indication. The external vehicle indication is outputted to at least a portion of a surrounding environment of the autonomous vehicle.

Another example aspect of the present disclosure is directed to a computing system for communicating future autonomous vehicle actions. The computing system includes one or more processors and one or more memory devices. The one or more memory devices store instructions that when executed by the one or more processors cause the computing system to perform operations. The operations include obtaining data associated with a planned motion of the autonomous vehicle. The operations include identifying a future vehicle action to be performed by the autonomous vehicle based at least in part on the data associated with the planned motion. The operations include outputting, by the computing system via an output device onboard the autonomous vehicle, an external vehicle indication that is indicative of the future vehicle action. The external vehicle indication is indicative of a type of the future vehicle action to be performed by the autonomous vehicle and a timing associated with the future vehicle action. The external vehicle indication is outputted to at least a portion of a surrounding environment of the autonomous vehicle.

Yet another example aspect of the present disclosure is directed to an autonomous vehicle. The autonomous vehicle includes one or more output devices, one or more processors, and one or more memory devices. The one or more memory devices store instructions that when executed by the one or more processors cause the autonomous vehicle to perform operations. The operations include obtaining data associated with a planned motion of the autonomous vehicle. The operations include identifying a future vehicle action to be performed by the autonomous vehicle based at least in part on the data associated with the planned motion. The operations include determining an external vehicle indication that is indicative of a status of the future vehicle action. The operations include outputting, via the one or more output devices, the external vehicle indication. The external vehicle indication is outputted to at least a portion of a surrounding environment of the autonomous vehicle.

Other example aspects of the present disclosure are directed to systems, methods, vehicles, apparatuses, tangible, non-transitory computer-readable media, and memory devices for communicating future autonomous vehicle actions.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
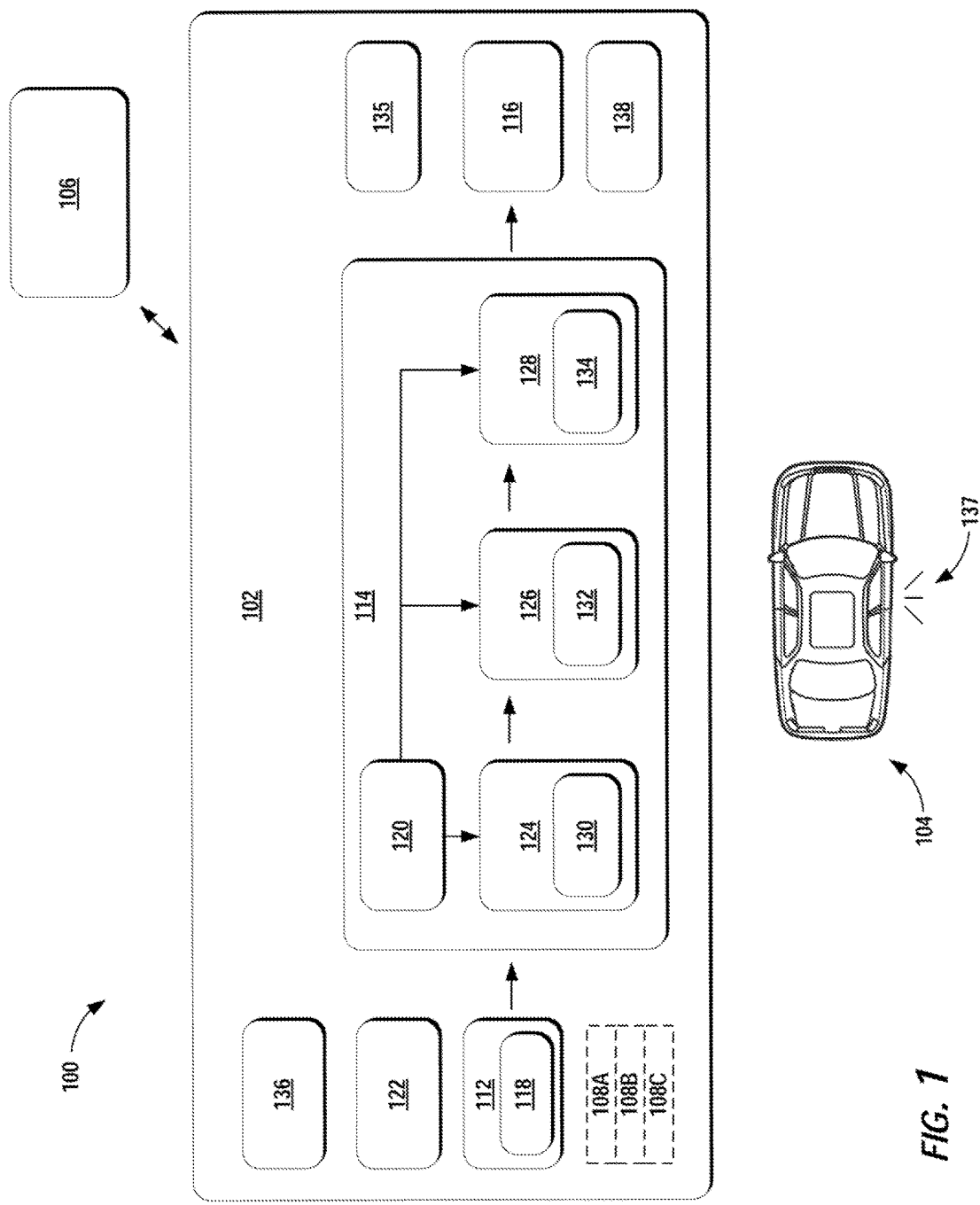
FIG. 1 depicts an example computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to communicating future vehicle actions of an autonomous vehicle. For instance, an autonomous vehicle can be a vehicle that can drive, navigate, operate, etc. with minimal and/or no interaction from a human operator. To do so, the autonomous vehicle can receive sensor data from sensor(s) onboard the vehicle (e.g., cameras, LIDAR, RADAR), attempt to comprehend the vehicle's surrounding environment based on the sensor data, and generate an appropriate motion plan through the vehicle's surrounding environment. As such, the autonomous vehicle can learn the type of vehicle actions it will perform as well as the future time/location at which the vehicle will perform these actions. The autonomous vehicle can leverage such knowledge to communicate its future vehicle actions to objects within the surrounding environment of the vehicle (e.g., to users of other vehicles, pedestrians, bicyclists, other autonomous vehicles, etc.), well in advance. The autonomous vehicle can provide an external vehicle indication (e.g., an external communication) to the vehicle's surrounding environment that indicates the type and timing of the future vehicle action. By way of example, the autonomous vehicle can activate one or more lighting elements and/or a user interface (e.g., on the exterior of the vehicle) that indicates the type of future vehicle action (e.g., in-lane nudge action, etc.) and the timing of the future vehicle action (e.g., 5 s, 10 s, etc. into the future). In this way, the autonomous vehicle can leverage its planned motion to help better communicate the vehicle's intended actions to others around the autonomous vehicle.

More particularly, an autonomous vehicle can be a ground-based autonomous vehicle (e.g., car, truck, bus, etc.) or other type of vehicle that can operate with minimal and/or no interaction from a human operator. The autonomous vehicle can include a vehicle computing system located onboard the autonomous vehicle to help control the autonomous vehicle. The vehicle computing system is located onboard the autonomous vehicle, in that the vehicle computing system is located on or within the autonomous vehicle. The vehicle computing system can include one or more sensors (e.g., cameras, LIDAR, RADAR, etc.), an autonomy system (e.g., for determining autonomous navigation), one or more vehicle control systems (e.g., for controlling braking, steering, powertrain), etc. The sensor(s) can gather sensor data (e.g., image data, radar data, lidar data, etc.) associated with one or more object(s) that are proximate to the autonomous vehicle (e.g., within a field of view of the sensor(s)). The object(s) can include, for example, other vehicles (their operators), bicycles, pedestrians, etc. The sensor data can be indicative of characteristics (e.g., locations) associated with the object(s) at one or more times. The sensor(s) can provide such sensor data to the vehicle's autonomy system.

In addition to the sensor data, the vehicle computing system can retrieve or otherwise obtain map data that provides other detailed information about the surrounding environment of the autonomous vehicle. The map data can provide information regarding: the identity and location of different roadways, road segments, buildings, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); and/or any other map data that provides information that assists the computing system in comprehending and perceiving its surrounding environment and its relationship thereto. In some implementations, the vehicle computing system can determine a vehicle route for the autonomous vehicle to follow, based at least in part on the map data.

The autonomy computing system can be a computing system that includes various sub-systems that cooperate to perceive the surrounding environment of the autonomous vehicle and determine a motion plan for controlling the motion of the autonomous vehicle. For instance, the autonomy computing system can process the sensor data from the sensor(s) to detect the one or more objects that are proximate to the autonomous vehicle as well as state data associated therewith. The state data for each object can describe an estimate of the object's current location (also referred to as position), current speed/velocity, current acceleration, current heading, current orientation, size/footprint, class (e.g., vehicle class vs. pedestrian class vs. bicycle class), and/or other state information.

The autonomy computing system can create predicted data associated with one or more of the objects. The predicted data can be indicative of one or more predicted future locations of each respective object. In particular, the predicted data can indicate a predicted path associated with each object. The predicted path can be indicative of a trajectory along which the respective object is predicted to travel over time (and/or the speed at which the object is predicted to travel along the predicted path).

The autonomy computing system can determine a motion plan for the autonomous vehicle based at least in part on the predicted data and/or other data such as a vehicle route for which the autonomous vehicle is to follow. The motion plan can include vehicle actions with respect to the objects proximate to the vehicle as well as the predicted movements. For instance, the autonomy computing system can implement an optimization algorithm that considers cost data associated with a vehicle action as well as other objective functions (e.g., cost functions based on speed limits, traffic lights, etc.), if any, to determine optimized variables that make up the motion plan. By way of example, the autonomy computing system can determine that the vehicle can perform a certain action (e.g., pass an object) without increasing the potential risk to the vehicle and/or violating any traffic laws (e.g., speed limits, lane boundaries, signage, etc.). The vehicle actions can be determined to control a motion of the autonomous vehicle, for example, without user input to the autonomous vehicle. The motion plan can include these vehicle actions to be performed by the autonomous vehicle, a planned trajectory, a vehicle speed, a vehicle acceleration, etc.

In some implementations, the autonomous vehicle can include a collision mitigation system. The collision mitigation system can be independent from the autonomy computing system and, in some implementations, can include sensors that are independent from those that acquire sensor data for the autonomy computing system. The collision mitigation system can be configured as a backup safety measure that identifies object(s) with which the vehicle may potentially collide. The collision mitigation system can determine one or more vehicle actions for the autonomous vehicle to perform to avoid the potential collision. Such actions can be provided as part of, or separate from, the motion plan.

The vehicle computing system can be configured to identify future vehicle actions that should be communicated to objects within the surrounding environment of the autonomous vehicle. For example, the vehicle computing system can obtain data associated with a planned motion of the autonomous vehicle. Such data can include the motion plan (e.g., determined by the autonomy computing system), data indicative of a vehicle route along which the vehicle is to travel, data associated with the collision mitigation system (e.g., a vehicle motion determined by the collision mitigation system), and/or other data, as described herein. The vehicle computing system can identify a future vehicle action to be performed by the autonomous vehicle based at least in part on the data associated with the planned motion. For example, the vehicle computing system can process the motion plan to determine what future actions the autonomous vehicle is to perform within a certain time into the future (e.g., 10, 20, 30 seconds into the future) and/or at a future location (e.g., 0.5, 1.0, 2.0, etc. miles from a current location). Additionally, or alternatively, the vehicle computing system can process a vehicle route to determine when and where the autonomous vehicle will perform a future vehicle action. The future vehicle actions can include a nudge action (e.g., a change in a position of the autonomous vehicle within a current travel lane), a lane change, a turn, an increase in vehicle speed, a decrease in vehicle speed, a stopping action, a parking action, an evasive maneuver, and/or other vehicle actions at a future point in time.

The vehicle computing system can determine an external vehicle indication that is indicative of the future vehicle action to be performed by the autonomous vehicle. An external vehicle indication can be a communication that can be viewed, heard, and/or otherwise received by an object that is located within the surrounding environment of the autonomous vehicle (e.g., in proximity to the autonomous vehicle). For example, the external vehicle indication can include a visual indication and/or an auditory indication that can be seen and/or heard by an operator of another vehicle, a bicyclist, a pedestrian, etc. within proximity of the autonomous vehicle. The vehicle computing system can access a data structure that defines the external vehicle indication that is to be utilized for a particular future vehicle action. Such a data structure can be stored, for example, in a memory onboard the autonomous vehicle. The data structure can include a rule, table, list, tree, and/or other type of data structure that indicates which type of external vehicle indication is to be used for which future vehicle action. By way of example, the data structure can indicate that the autonomous vehicle is to illuminate a certain lighting element (or set of lighting elements) when the future vehicle action is a nudge action.

In some implementations, the type of external vehicle indication can be based at least in part on the type(s) of object(s) within the surrounding environment of the autonomous vehicle. For example, the vehicle computing system may classify an object surrounding the vehicle as a pedestrian. As such, the vehicle computing system can determine that the external vehicle indication should include both a visual and an auditory indication (e.g., in case the pedestrian is visually impaired). In another example, the vehicle computing system may classify the objects surrounding the autonomous vehicle as other vehicles (e.g., with human operators). As such, the vehicle computing system can determine that the external vehicle indication may include only a visual indication (e.g., because the operator of another vehicle is unlikely to hear the auditory indication). In this way, the autonomous vehicle can tailor its external vehicle indications to its potential audience to cater to the potential needs of the audience, while also saving valuable processing and memory resources when possible (by avoiding unnecessary indications).

The external vehicle indication can be indicative of a status of the future vehicle action. For instance, the external vehicle indication can be indicative of a type of the future vehicle action to be performed by the autonomous vehicle and the timing associated with the future vehicle action. By way of example, the external vehicle indication can provide a communication indicating that the vehicle will perform a nudge action, turn, lane change, speed reduction, speed increase, evasive maneuver, etc. Moreover, the external vehicle indication can communicate the time, distance, location, etc. at which (or until which) the autonomous vehicle will perform the future vehicle action.

The vehicle computing system can output the external vehicle indication via one or more output devices located onboard the autonomous vehicle to at least a portion of a surrounding environment of the autonomous vehicle. In some implementations, the output device(s) can include one or more lighting elements. The external vehicle indication can include a visual indication that is provided via the one or more lighting elements. By way of example, the output device(s) can include three chevron lighting elements that can be illuminated. The vehicle computing system can determine (e.g., based at least in part on a data structure) that one of the chevron lighting elements is to be illuminated for a nudge action, two chevron lighting elements are to be illuminated for a lane change action, and/or three chevron lighting elements are to be illuminated for a turn action. The vehicle computing system can provide one or more control signals to cause the lighting elements to illuminate to appropriately reflect the corresponding future vehicle action. Moreover, the autonomous vehicle can adjust the frequency of the illumination of the lighting element(s) to indicate the timing of the future vehicle action. For example, the rate at which the lighting element(s) are illuminated (e.g., flashing) can increase as the vehicle gets closer to performing the future vehicle action (e.g., nudging around a parked bicycle). In this way, the autonomous vehicle can utilize the lighting element(s) to indicate the type and timing of the future vehicle action.

In some implementations, the autonomous vehicle can include a display device that is located on the vehicle exterior and/or outwardly facing from the vehicle interior. The vehicle computing system can send one or more control signals to cause a user interface to be displayed via the display device. The user interface can present the external vehicle indication to communicate the future vehicle action (e.g., a textual message, graphical representation indicative of the nudge action, etc.). Moreover, the user interface can indicate the amount of time and/or distance until the vehicle is to perform the future vehicle action. The amount of time and/or distance can be updated as the autonomous vehicle gets closer to performing the future vehicle action (e.g., time/distance countdown). Additionally, or alternatively, the user interface can indicate the location of the future vehicle action (e.g., "slight right turn at Main St."). In this way, the autonomous vehicle can utilize a user interface to communicate the type of future vehicle action that the vehicle is to perform (e.g., a nudge, lane change, turn, etc.) as well as the associated timing.

When the autonomous vehicle eventually performs the future vehicle action, the vehicle computing system can adjust the external vehicle indication. For example, the autonomous vehicle can perform the future vehicle action (e.g., a lane change). In response, the vehicle computing system can cause the external indication to cease being provided to the surrounding environment of the autonomous vehicle (e.g., cease illumination of the lighting element(s)). In some implementations, the vehicle computing system can output another external indication in response to the vehicle performing the future vehicle action. For instance, as the autonomous vehicle is performing a nudge action, the vehicle computing system can adjust the user interface to indicate that the vehicle is currently changing position within the vehicle's current travel lane. This can inform the objects within the surrounding environment of the action currently being performed by the autonomous vehicle.

The systems and methods described herein may provide a number of technical effects and benefits. For instance, the systems and methods enable a vehicle computing system to generate more accurate indications of future vehicle actions. The improved indications can provide others with a more granular understanding of the autonomous vehicle's intentions as well as the timing associated therewith. As such, the autonomous vehicle can better inform others of planned vehicle motion than is possible with typical motion indicators (e.g., turn signals, brake lights, etc.), which only provide a high level of information that can be interpreted as more than one possible vehicle action (e.g., lane change vs. turn) and generally fails to provide an advanced indication of action timing. Objects within the surrounding environment of the autonomous vehicle can utilize the external vehicle indications to better avoid potential interference (e.g., collisions) with an autonomous vehicle. Moreover, the systems and methods described herein can help increase third party trust in autonomous vehicles via the use of such external vehicle indications.

The systems and methods of the present disclosure also provide an improvement to vehicle computing technology, such as autonomous vehicle computing technology. For instance, the computer-implemented methods and systems described herein improve the ability of the vehicle computing technology to communicate future vehicle actions to the vehicle's surrounding environment. For example, the systems and methods can enable a computing system (e.g., onboard an autonomous vehicle) to obtain data associated with a planned motion of the autonomous vehicle. The computing system can identify a future vehicle action to be performed by the autonomous vehicle based at least in part on the data associated with the planned motion. The computing system can determine an external vehicle indication that is indicative of the future vehicle action to be performed by the autonomous vehicle. The external vehicle indication can be indicative of a type of the future vehicle action to be performed by the autonomous vehicle and a timing associated with the future vehicle action. The computing system can output, via an output device onboard the autonomous vehicle, the external vehicle indication to at least a portion of a surrounding environment of the autonomous vehicle. In this way, the computing system can leverage the data determined for autonomous vehicle operation (e.g., the data associated with the motion plan) to identify future vehicle actions and provide indications regarding the same. As such, an autonomous vehicle can provide indications of future vehicle actions well in advance of those provided via typical vehicle motion indicators.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as for managing a fleet of vehicles.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator (e.g., driver). In some implementations, a human operator can be included in the vehicle 104. In some implementations, a human operator can be omitted from the vehicle 104 (and/or also omitted from remote control of the vehicle 104).

The vehicle 104 can be configured to operate in a plurality of operating modes 108A-C. The vehicle 104 can be configured to operate in a fully autonomous (e.g., self-driving) operating mode 108A in which the vehicle 104 is controllable without user input (e.g., can drive and navigate with no input from a human operator present in the vehicle 104 and/or remote from the vehicle). The vehicle 104 can operate in a semi-autonomous operating mode 108B in which the vehicle 104 can operate with some input from a human operator present in the vehicle 104 (and/or remote from the vehicle 104). The vehicle 104 can enter into a manual operating mode 108C in which the vehicle 104 is fully controllable by an operator (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

The operating modes 108A-C of the vehicle 104 can be stored in a memory and/or data registrar onboard the vehicle 104. For example, the operations modes 108A-C can be defined by a data structure (e.g., rule, list, table, etc.) that indicates one or more operating parameters for the vehicle 104, while in the particular operation mode 108A-C. For example, the data structure can indicate that the vehicle 104 is to autonomously plan its motion when in the fully autonomous operating mode 108A. Moreover, the data structure can include a rule that indicates the vehicle 104 is to provide external vehicle indications to at least a portion of the vehicle's surrounding environment when in the fully autonomous operating mode 108A. The vehicle computing system 102 can access the memory and/or data registrar when implementing an operating mode 108A-C.

The operating mode 108A-C of the vehicle 104 can be adjusted in a variety of manners. In some implementations, the operating mode 108A-C of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous mode 108A. In some implementations, the operating mode 108A-C of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode 108A-C of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode 108A-C of the vehicle 104 can be adjusted based at least in part on a sequence of interfaces located on the vehicle 104. For example, the operating mode 108A-C may be adjusted by manipulating a series of interfaces in a particular order to cause the vehicle 104 to enter into a particular operating mode 108A-C.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for communicating future vehicle actions.

As shown in FIG. 1, the vehicle 104 can include one or more sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104. The motion plan 134 can be indicative of future vehicle actions (e.g., actions to be taken by the vehicle at a future time and/or location) as well as the future time and/or location at which these actions are to be taken by the vehicle 104.

In some implementations, the vehicle 104 can include a collision mitigation system 135. The collision mitigation system 135 can be independent from the autonomy computing system 114. In some implementations, the collision mitigation system 135 can include sensors that are independent from the sensor(s) 112 that acquire sensor data 118 for the autonomy computing system 114. The collision mitigation system 135 can be configured as a backup safety measure that identifies object(s) with which the vehicle 104 may potentially collide. The collision mitigation system 135 can determine one or more future vehicle actions for the vehicle 104 to perform to avoid the potential collision. Such actions can be provided as part of, or separate from, the motion plan.

The collision mitigation system 135 can monitor a surrounding environment of the vehicle 104 using sensor(s) (e.g., a Radio Detection and Ranging (RADAR) system, one or more cameras, and/or other types of image capture devices and/or sensors) associated therewith. The collision mitigation system 135 can identify one or more object(s) in the surrounding environment based at least in part on information provided by its associated sensor(s). The collision mitigation system 135 can detect one or more potential collision(s) with the identified object(s). When a potential collision is detected, the collision mitigation system 135 can control the vehicle 104 to avoid the potential collision. For example, the collision mitigation system 135 can provide information associated with the potential collision to the autonomy computing system 114, which can adjust a trajectory of the vehicle 104 to avoid the potential collision. In some implementations, the collision mitigation system 135 can send control signal(s) to the control system(s) 116 to adjust a motion of the vehicle 104 (e.g., to activate a braking system). Additionally, or alternatively, the collision mitigation system 135 can send one or more control signals to activate a warning within the interior of the vehicle 104 (e.g., to warn an operator, rider, etc. within the vehicle 104).

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication.

The vehicle computing system 102 can be configured to identify future vehicle actions that should be communicated to objects within the surrounding environment of the vehicle 104. For instance, the vehicle computing system 102 can obtain data associated with a planned motion of the vehicle 104. The data associated with the planned motion of the vehicle 104 can be generated onboard the vehicle 104. The data associated with the planned motion of the vehicle 104 can include, for example, data indicative of the motion plan 134 (e.g., determined by the autonomy computing system 114), data associated with the collision mitigation system 135 (e.g., a vehicle motion determined by the collision mitigation system 135), and/or other data, as described herein. Additionally, or alternatively, the data associated with the planned motion of the vehicle 104 can include data indicative of a vehicle route along which the vehicle 104 is to travel.

The vehicle computing system 102 can identify a future vehicle action to be performed by the vehicle 104 based at least in part on the data associated with the planned motion. For example, the vehicle computing system 102 can process data indicative of a motion plan 134 to determine what future vehicle actions the vehicle 104 is to perform within a certain time into the future (e.g., 10, 20, 30 seconds into the future). Additionally, or alternatively, the vehicle computing system 102 can process data indicative of the motion plan 134 to determine a location associated with the future vehicle action. The location can be a future location that the vehicle 104 intends to reach (e.g., in accordance with a vehicle route, motion plan, etc.). The future location can be expressed as a distance (e.g., 0.5, 1.0, 2.0, etc. miles) from a reference location (e.g., the current location of the vehicle 104, etc.), at a particular geographic point/area (e.g., at a particular intersection, etc.), at a particular place (e.g., with respect to certain building, etc.), and/or in another manner. Additionally, or alternatively, the vehicle computing system 102 can process a vehicle route to determine when and where the vehicle 104 is to perform a future vehicle action. In some implementations, the vehicle computing system 102 can process data associated with the collision mitigation system 135 (e.g., data indicative of a potential collision, data indicative of a recommended change in vehicle motion to avoid a potential collision, etc.). The future vehicle action can be associated with a vehicle action determined by the collision mitigation system 135 of the vehicle 104 to avoid a potential collision.

The future vehicle actions can include a variety of actions to be performed by a vehicle 104. For instance, a future vehicle action can include a nudge action (e.g., a change in a position of the vehicle 104 within a current travel lane), a lane change, a turn, an increase in vehicle speed, a decrease in vehicle speed, a stopping action, a parking action, an evasive maneuver, and/or other vehicle actions at a future point in time (and/or distance). The future vehicle action can be, for instance, an action to control a motion of the vehicle 104 without user input to the vehicle 104 (e.g., fully autonomous operation).

Figure 2:
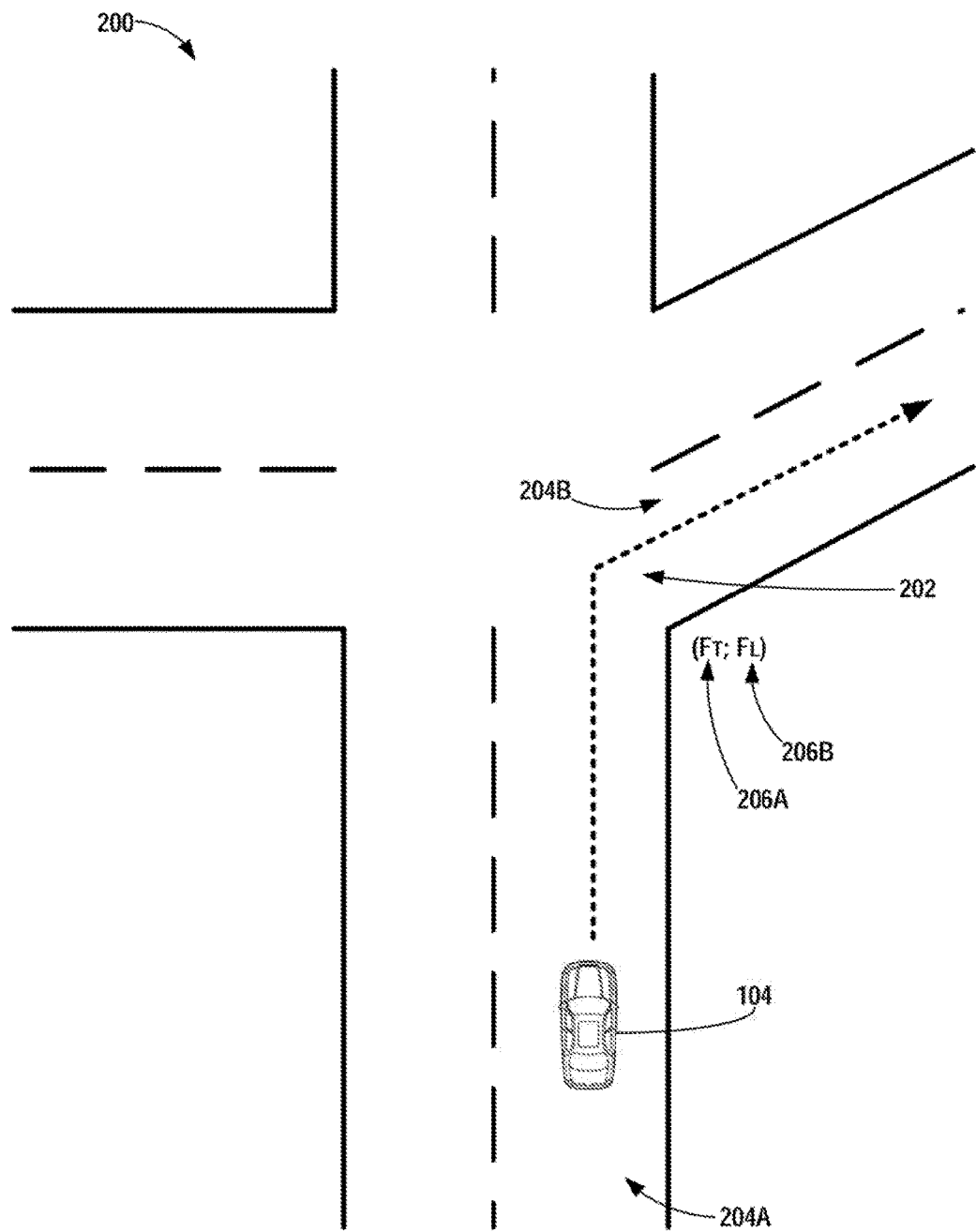
FIG. 2 depicts a diagram of an example future vehicle action according to example embodiments of the present disclosure.

FIG. 2 depicts a diagram 200 of an example future vehicle action 202 according to example embodiments of the present disclosure. As shown in FIG. 2, the future vehicle action 202 can include a turn action from a first travel way 204A to a second travel way 204B. The vehicle computing system 102 can process the data associated with the planned motion of the vehicle 104 to identify the future vehicle action 202. By way of example, the vehicle computing system 102 can process the data indicative of a vehicle route to identify that the vehicle 104 is to turn from the first travel way 204A onto the second travel way 204B at a future time 206A ("$F_T$") and/or location ("$F_L$") 206B.

Figure 3:
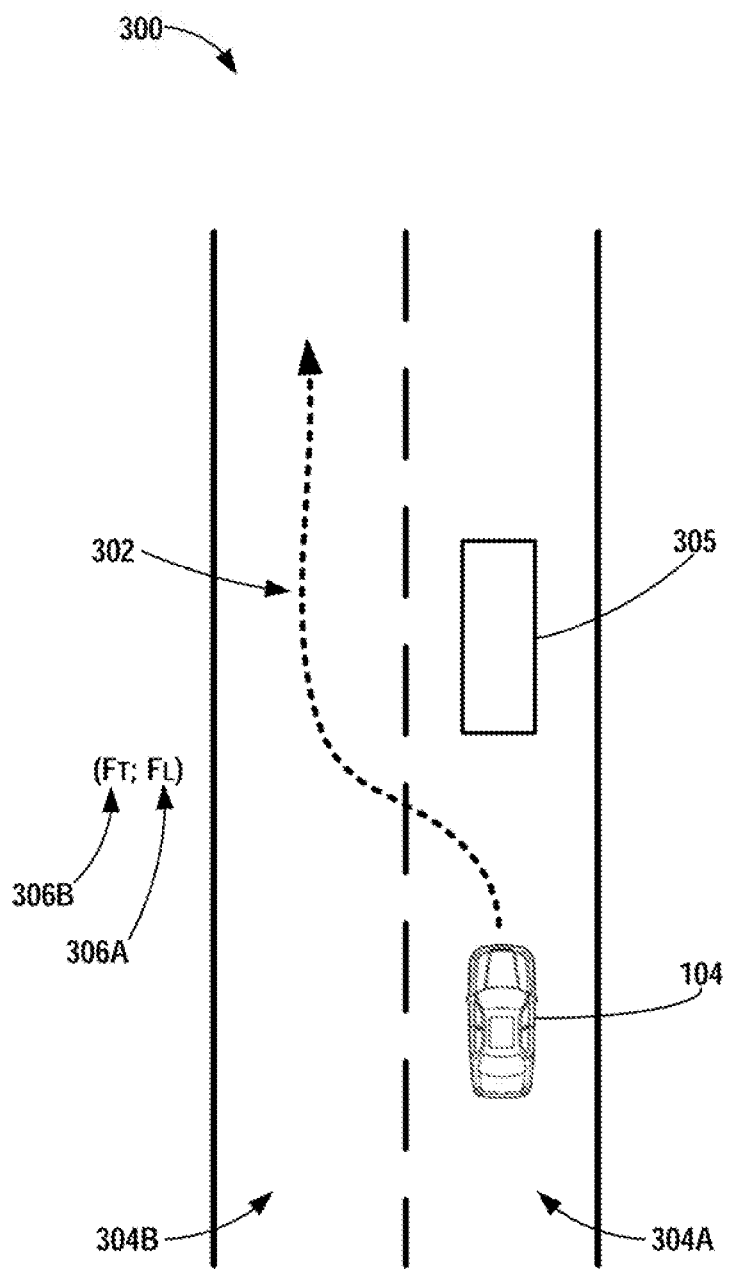
FIG. 3 depicts a diagram of an example future vehicle action according to example embodiments of the present disclosure.

FIG. 3 depicts a diagram 300 of another example future vehicle action 302 according to example embodiments of the present disclosure. As shown in FIG. 3, the future vehicle action 302 can include a lane change from a first travel lane 304A (e.g., identified by one or more designated travel boundaries) to a second travel lane 304B (e.g., identified by one or more designated travel boundaries). The vehicle computing system 102 can process the data associated with the planned motion of the vehicle 104 to identify the future vehicle action 302. By way of example, the vehicle computing system 102 (e.g., perception system 124) can identify an object 305 (e.g., another vehicle) within the first travel lane 304A and predict that the object will continue within the first travel lane 304A at a speed that is under a designated speed limit. The vehicle computing system 102 can plan the future trajectories of the vehicle 104 based at least in part on the object 135 and/or its predicted motion. For example, the vehicle computing system 102 (e.g., the motion planning system 128) can generate a motion plan 134 that includes the future vehicle action 302 to cause the vehicle 104 to change lanes from the first travel lane 304A to the second travel lane 304B at future time 306A ("$F_T$") and/or location ("$F_L$") 306B. The vehicle computing system 102 can process the data associated with such a motion plan 134 (e.g., determined onboard the vehicle 104) to identify that the vehicle 104 is to change lanes at this future time 306A ("$F_T$") and/or location ("$F_L$") 306B.

Figure 4:
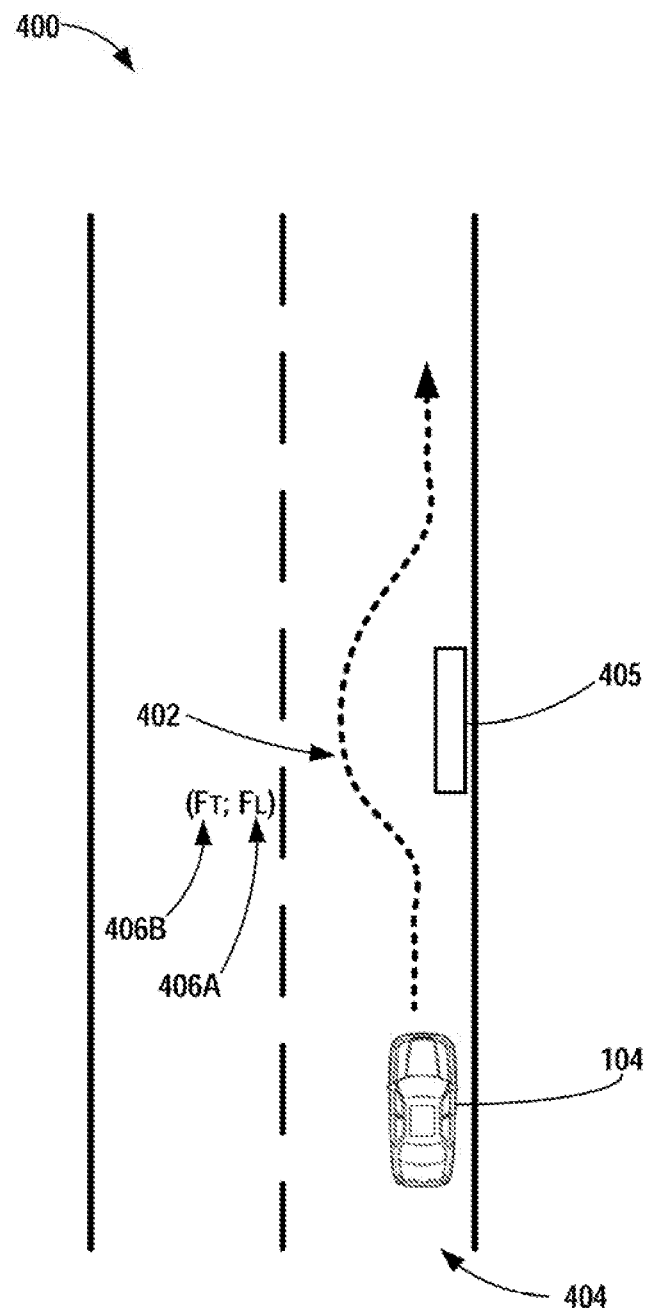
FIG. 4 depicts a diagram of an example future vehicle action according to example embodiments of the present disclosure.

FIG. 4 depicts a diagram 400 of another example future vehicle action 402 according to example embodiments of the present disclosure. As shown in FIG. 4, the future vehicle action 402 can include a nudge action. The nudge action can include a change in a position of the vehicle 104 within a current travel lane 404. The vehicle computing system 102 can process the data associated with the planned motion of the vehicle 104 to identify the future vehicle action 402. For example, the collision mitigation system 135 of the vehicle 104 can identify an object 405 (e.g., a parked vehicle) within the current travel lane 404. The collision mitigation system 135 can determine that a potential collision would occur with the object 405 in the event that the vehicle 104 continues on its planned trajectory. Accordingly, the collision mitigation system 135 can determine that the vehicle 104 is to perform a future vehicle action 402 to nudge around the parked vehicle at a future time 406A ("$F_T$") and/or location ("$F_L$") 406B. The vehicle computing system 102 can process the data associated with the collision mitigation system 135 to identify that the vehicle 104 is to perform a nudge action within the travel lane 404 at the future time 406A ("$F_T$") and/or location ("$F_L$") 406B.

Returning to FIG. 1, the vehicle computing system 102 can determine an external vehicle indication 137 that is indicative of a status of a future vehicle action. An external vehicle indication 137 can be a communication that can be viewed, heard, and/or otherwise received by an object that is located within the surrounding environment of the vehicle 104 (e.g., in proximity to the vehicle 104). For example, the external vehicle indication can include a visual indication and/or an auditory indication that can be seen and/or heard by an operator of another vehicle, a bicyclist, a pedestrian, etc. within proximity of the vehicle 104. The status of the future vehicle action can include the type of the future vehicle action to be performed by the vehicle 104 and a timing associated with the future vehicle action, as further described herein. By way of example, the external vehicle indication 137 can provide a communication indicating that the vehicle 104 will perform a nudge action, turn, lane change, speed reduction, speed increase, evasive maneuver, etc. Moreover, the external vehicle indication 137 can communicate the time, distance, location, etc. at which (or until which) the vehicle 104 will perform the future vehicle action.

To determine the appropriate external vehicle indication 137, the vehicle computing system 102 can access a data structure that defines the parameters associated with external vehicle indication 137 that is to be utilized for a particular future vehicle action. Such a data structure can be stored, for example, in an accessible memory (e.g., memory devices, data registrar, etc.) onboard the vehicle 104 and/or that is remotely accessible by the vehicle computing system 102. The data structure can include a rule, table, list, tree, and/or other type of data structure that indicates which external vehicle indication 137 is to be used for a particular future vehicle action. By way of example, the data structure can indicate that the vehicle 104 is to illuminate a certain lighting element (or set of lighting elements) when the future vehicle action is a nudge action.

In some implementations, the type of external vehicle indication 137 can be based at least in part on the type(s) of object(s) within the surrounding environment of the vehicle 104. For example, the vehicle computing system 102 (e.g., the perception system 124) may classify an object surrounding the vehicle 104 as a pedestrian. As such, the vehicle computing system 102 can determine (e.g., based at least in part on the stored data structure) that the external vehicle indication 137 should include both a visual and an auditory indication (e.g., in case the pedestrian is visually impaired). In another example, the vehicle computing system 102 may classify an object surrounding the vehicle 104 as another vehicle (e.g., with a human operator). As such, the vehicle computing system 102 can determine (e.g., based at least in part on the stored data structure) that the external vehicle indication 137 may include only a visual indication (e.g., because the operator of another vehicle is unlikely to hear the auditory indication). In this way, the vehicle computing system 104 can adjust the external vehicle indication 137 based at least in part on the classification of one or more objects within the surrounding environment of the vehicle 104 (e.g., its potential audience). This can enable to vehicle computing system 102 to customize the external vehicle indication 137 to better reach those objects, while also saving valuable processing and memory resources when possible (by avoiding unnecessary indications).

The vehicle computing system 102 can output the external vehicle indication 137 via one or more output devices 138 located onboard the vehicle 104. The external vehicle indication 137 can be outputted to at least a portion of a surrounding environment of the vehicle 104 (e.g., a portion in which one or more objects are located). The output device(s) 138 can include one or more devices that are configured to produce an indication that can be received (e.g., seen, heard, etc.). For example, the one or more output devices 138 can be located on an exterior of the vehicle 104 and/or outwardly facing from the vehicle interior. The output device(s) 138 can include one or more visual output devices (e.g., lighting element, display device, etc.) and/or one or more an audio output device(s) (e.g., speaker, etc.).

Figure 5:
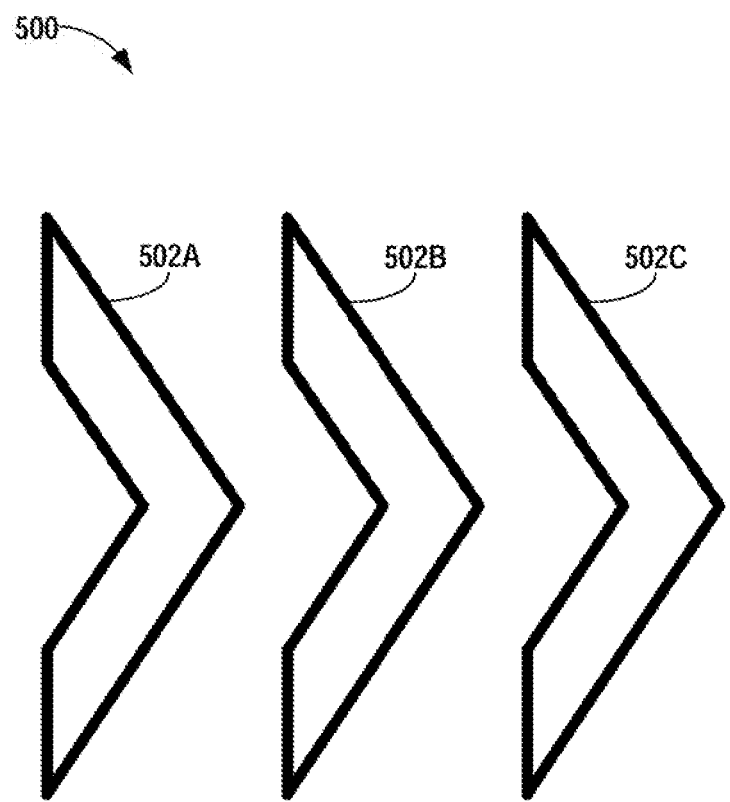
FIG. 5 depicts an example output device for an external vehicle indication according to example embodiments of the present disclosure.

For example, the output device(s) 138 can include one or more lighting elements. The external vehicle indication 137 can include a visual indication that is provided via the one or more lighting elements. FIG. 5 an example output device 500 for an external vehicle indication 137 according to example embodiments of the present disclosure. The output device 500 can include one or a plurality of example lighting elements 502A-C. By way of example, as shown in FIG. 5, the lighting elements 502A-C can include a plurality of illuminable chevron lighting elements. The shapes and/or configurations of FIG. 5 are not intended to be limiting. The lighting element(s) 502A-C can be other shapes and/or in other configurations. The output device(s) 138 of the vehicle 104 can include the output device 500.

The vehicle computing system 102 can determine one or more activation characteristics of the output device 500 for the external vehicle indication 137 (e.g., based at least in part on the stored data structure). In some implementations, one or more first activation characteristic(s) (e.g., an illumination pattern, etc.) can be indicative of the type of future vehicle action to be indicated by the external vehicle indication 137. By way of example, the vehicle computing system 102 can determine that one of the lighting elements 502A is to be illuminated for a nudge action, two lighting elements 502A-B are to be illuminated for a lane change action, and/or three lighting elements 502A-C are to be illuminated for a turn action. In this way, the vehicle computing system 102 can indicate the type of future vehicle action via the first activation characteristic(s) (e.g., an illumination pattern, etc.) of the output device 500. Additionally, or alternatively, one or more second activation characteristic(s) (e.g., frequency, brightness etc.) can be indicative of the timing associated with a future vehicle action to be indicated by the external vehicle indication 137. The second activation characteristic(s) can be different than the first activation characteristic(s). By way of example, the vehicle computing system 102 can adjust the frequency and/or brightness of the illumination of the lighting element(s) 502A-C to indicate the timing of the future vehicle action. The rate and/or intensity at which the lighting element(s) 502A-C are illuminated (e.g., flashing) can increase as the vehicle 104 gets closer to performing the future vehicle action (e.g., nudging around a parked bicycle). In this way, the vehicle computing system 102 can indicate the timing associated with the future vehicle action via the second activation characteristic(s) (e.g., frequency, brightness, etc.).

In some implementations, the first and second activation characteristic(s) can be implemented concurrently and/or separately. By way example, the vehicle computing system 102 can cause the illumination pattern and/or frequency to be implemented such that the type (e.g., nudge action) and timing of the future vehicle action are indicated at overlapping timeframes, in independent timeframes, etc. The vehicle computing system 102 can provide one or more control signals to cause the output device 500 (e.g., lighting element(s) 502A-C) to illuminate to appropriately reflect the status of the corresponding future vehicle action.

Figure 6:
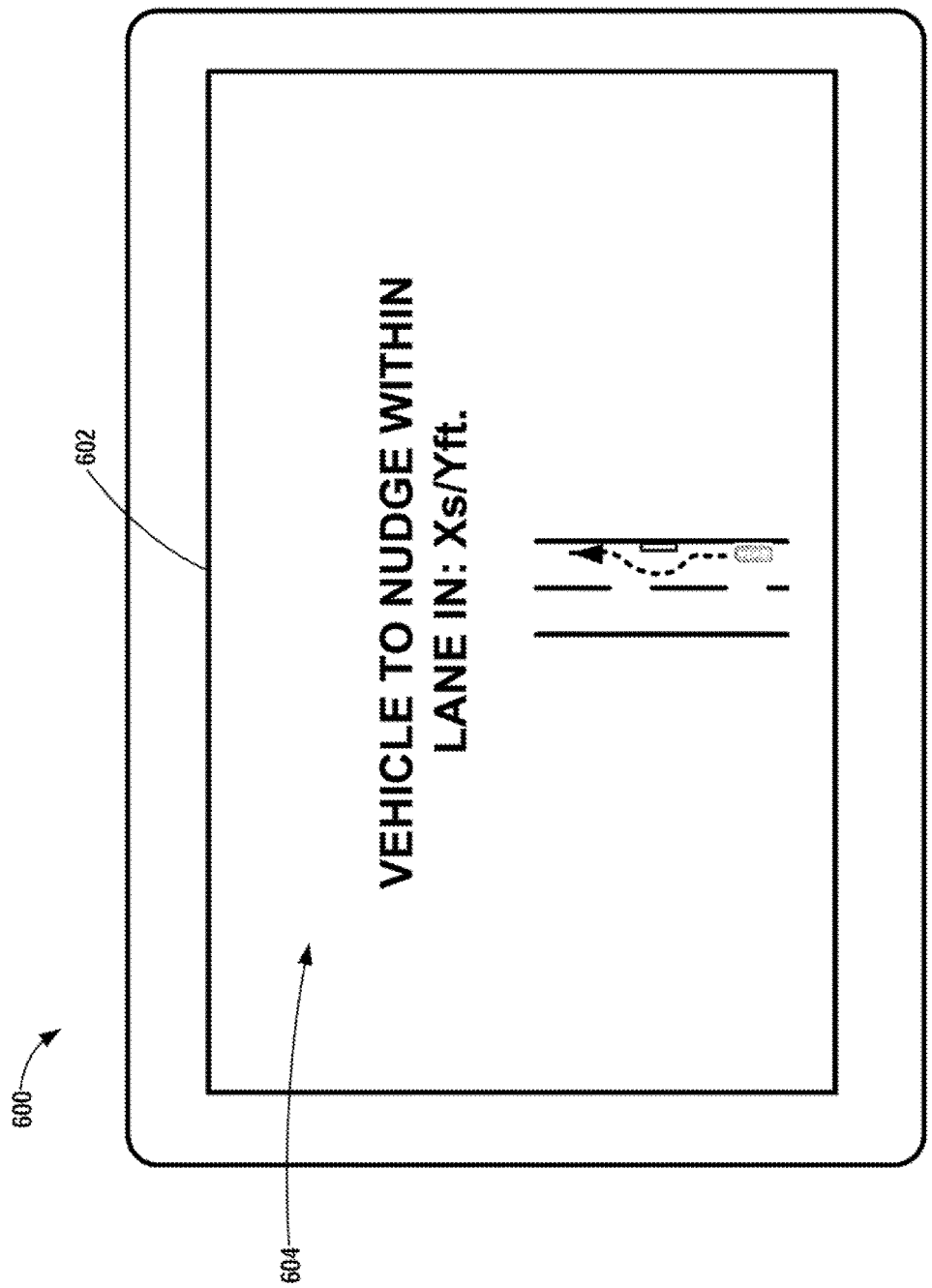
FIG. 6 depicts an example output device for an external vehicle indication according to example embodiments of the present disclosure.

Additionally, or alternatively, the output device(s) 138 can include a display device. For example, FIG. 6 depicts an example output device 600 for an external vehicle indication according to example embodiments of the present disclosure. The output device 600 can include a display device 602 (e.g., screen of a computing device) configured to present a user interface 604 that is viewable to at least a portion of the surrounding environment of the vehicle 104 (e.g., facing away from the vehicle 104). The display device 602 can be located on the vehicle exterior and/or outwardly facing from the vehicle interior. The output device(s) 138 of the vehicle 104 can include the output device 600.

The vehicle computing system 102 can send one or more control signals to cause the user interface 604 to be displayed via the display device 602. The external vehicle indication 137 can include a visual indication that is provided via the user interface 604 of the display device 602. For example, the user interface 604 can present the external vehicle indication 137 to communicate the future vehicle action. By way of example, as shown in FIG. 6, the user interface 604 can present a textual message, graphical representation, etc. that indicates the type of future vehicle action (e.g., a nudge action) to be performed by the vehicle 104. Moreover, the user interface 604 can indicate the timing associated with the future vehicle action. For example, the user interface 604 can indicate (e.g., via text message, graphical representation, etc.) the amount of time and/or distance until the vehicle 104 is to perform the future vehicle action. The amount of time and/or distance can be updated as the vehicle 104 gets closer to performing the future vehicle action (e.g., time/distance countdown) and/or if the time gets delayed (e.g., via a traffic jam). Additionally, or alternatively, the user interface 604 can indicate the location of the future vehicle action (e.g., "slight right turn at Main St."). As such, the vehicle computing system 102 can utilize the user interface 604 to communicate the type of future vehicle action that the vehicle 104 is to perform (e.g., a nudge, lane change, turn, etc.) as well as the timing associated with the future vehicle action.

In some implementations, the output device(s) 138 can be included in a LIDAR system of the vehicle 104. For example, the LIDAR system of the vehicle 104 can include one or more lighting elements and/or one or more display devices. The vehicle computing system 102 can output the external vehicle indication via the LIDAR system. For example, the vehicle computing system 102 can send one or more control signals to activate the lighting element(s) and/or display device(s) of the LIDAR system to output the external vehicle indication 137 (e.g., as the LIDAR system rotates).

In some implementations, the output device(s) 138 can include an audio output device (e.g., a speaker). The audio output device can be configured to produce sound indicative of the external vehicle indication 137. For example, the external vehicle indication can include an auditory indication. The auditory indication can include a message (e.g., voice message) and/or other sound (e.g., beep) that is indicative of the future vehicle action. For example, the auditory indication can be a message that states "the vehicle will take a slight right turn at Main St." The message can be repeated and/or increase in volume as the vehicle 104 approaches the time and/or location at which the vehicle 104 will perform the future vehicle action (e.g., the slight right turn at Main St.). In this way, vehicle computing system 102 can utilize an auditory indication to help communicate the type and/or timing of the future vehicle action (e.g., to a pedestrian).

The vehicle computing system 102 can cause the vehicle 104 to perform the future vehicle action. For example, the motion planning system 128 can provide the motion plan 134 with data indicative of the future vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined future vehicle action into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the future vehicle action. A similar such approach can be implemented for vehicle actions identified by the collision mitigation system 135.

When the vehicle 104 performs the future vehicle action, the vehicle computing system 102 can adjust the external vehicle indication 137. The vehicle 104 can start to perform and/or complete the future vehicle action (e.g., a nudge action). The vehicle computing system 102 can cause the external vehicle indication 137 (e.g., a first external vehicle indication) to cease being provided to the surrounding environment of the vehicle 104 (e.g., cease illumination of the lighting element(s) 502A-C, cease display of the visual indication on user interface 604, etc.). For example, the vehicle computing system 102 can send one or more control signals to cause the output device(s) to cease providing the external vehicle indication 137.

Figure 7:
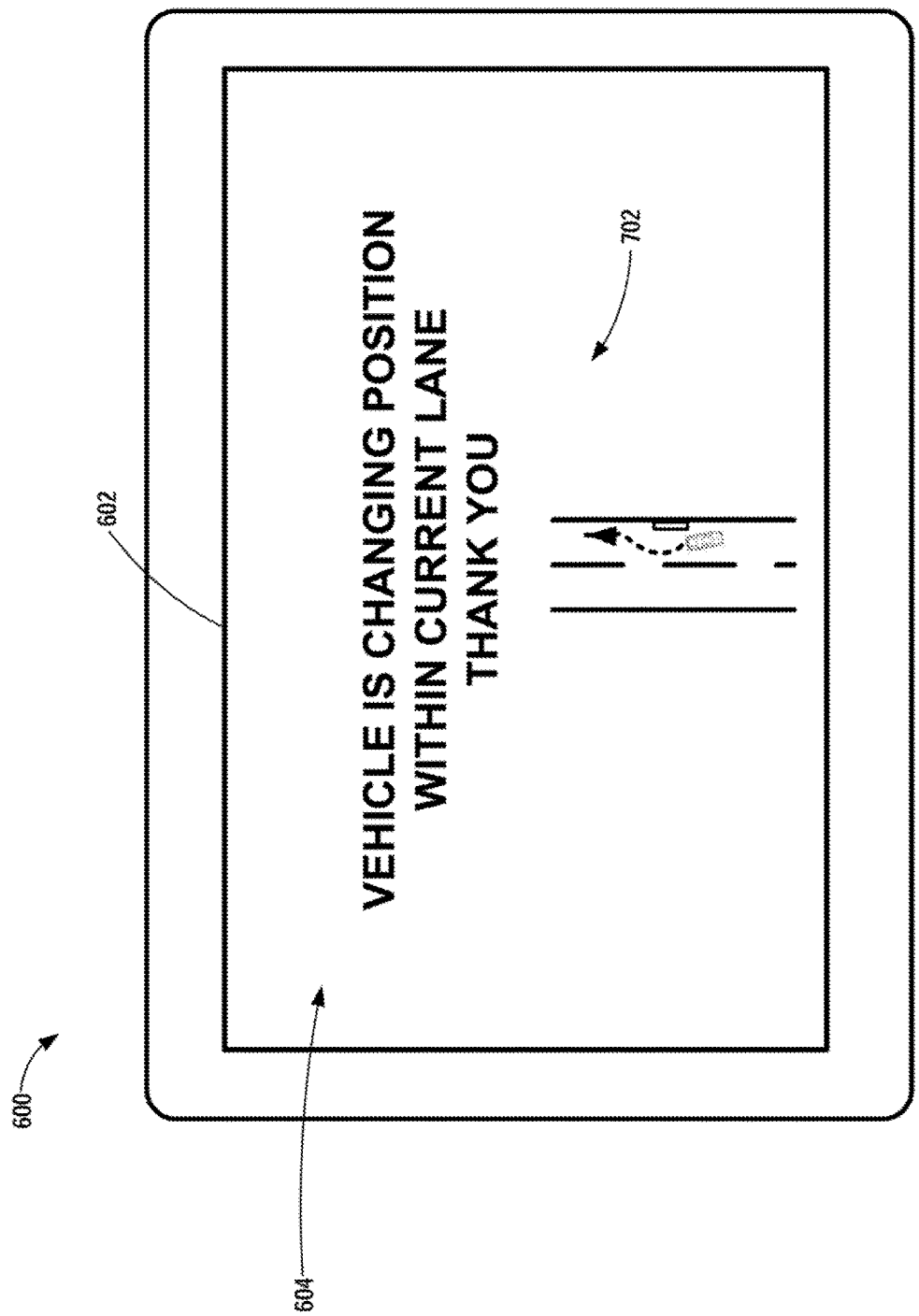
FIG. 7 depicts an example output device for an external vehicle indication according to example embodiments of the present disclosure.

In some implementations, the vehicle computing system 102 can output another external indication in response to the vehicle performing the future vehicle action. As the vehicle 104 is performing (and/or after it performs) a future vehicle action, the vehicle computing system 102 can to output, via the output device(s) 138 onboard the vehicle 104, a second external vehicle indication. For example, as shown in FIG. 7, the vehicle computing system 102 can adjust the user interface 604 to provide a second external vehicle indication 702. The second external vehicle indication 702 can indicate, for example, that the vehicle 104 is currently performing the future vehicle action (e.g., changing position within a current travel lane) and/or has performed the future vehicle action. This can inform the objects within the surrounding environment of the vehicle 104 that an action is currently being performed and/or has been performed by the vehicle 104.

Figure 8:
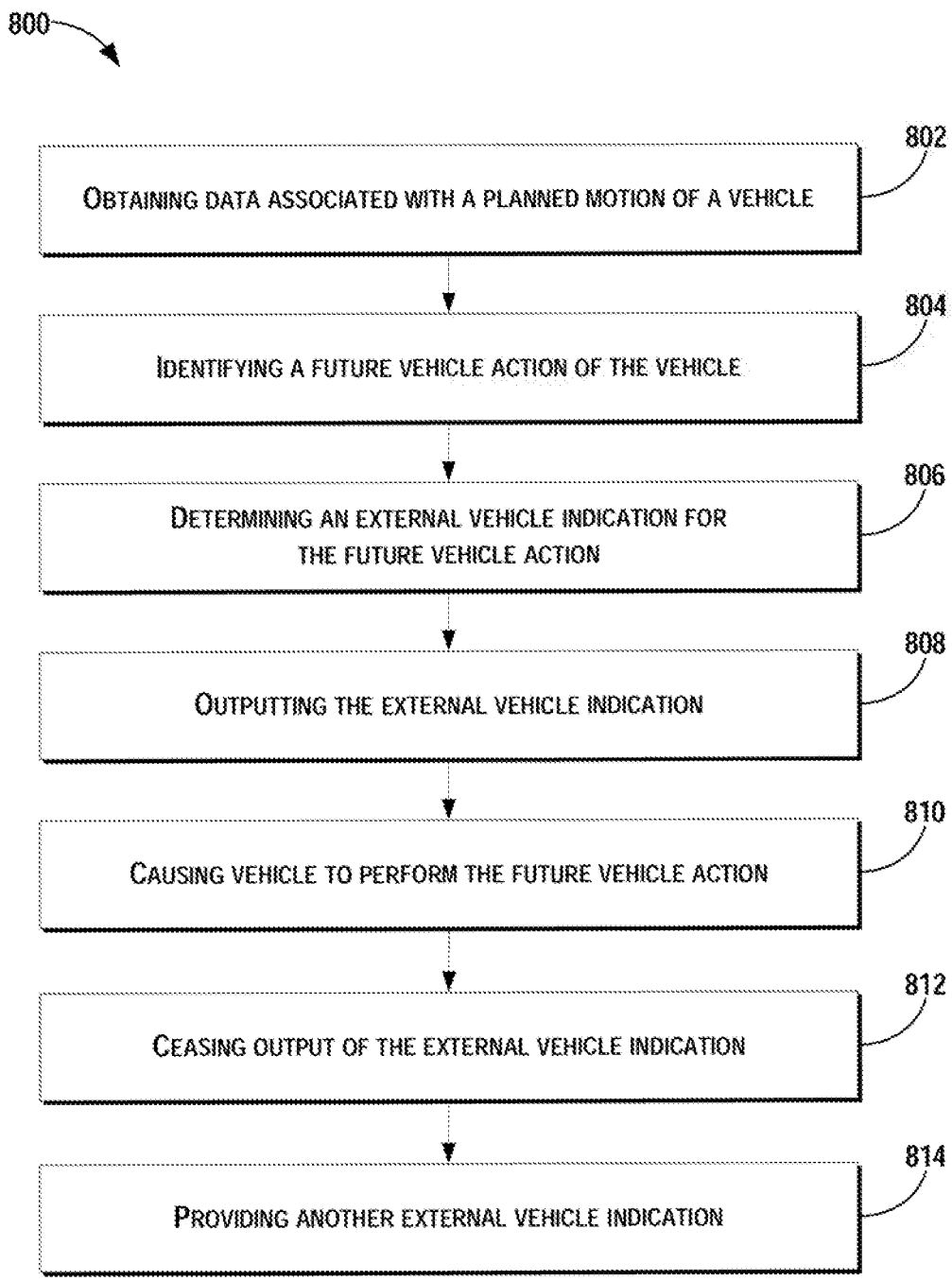
FIG. 8 depicts a flow diagram of an example method of communicating future autonomous vehicle actions according to example embodiments of the present disclosure.

FIG. 8 depicts a flow diagram of an example method 800 of communicating future autonomous vehicle actions according to example embodiments of the present disclosure. One or more portion(s) of the method 800 can be implemented by one or more computing devices such as, for example, the one or more computing device(s) of the vehicle computing system 102. Each respective portion of the method 800 (e.g., 802-814) can be performed by any (or any combination) of the one or more computing devices. Moreover, one or more portion(s) of the method 800 can be implemented as an algorithm on the hardware components of the device(s) described herein (e.g., as in FIGS. 1 and 9), for example, to communicate future autonomous vehicle actions. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (802), the method 800 can include obtaining data associated with a planned motion of a vehicle. The vehicle computing system 102 (e.g., onboard the vehicle 104) can obtain data associated with a planned motion of the vehicle 104. The vehicle 104 can operate in a fully autonomous operating mode 108A in which the vehicle 104 is controllable without user input. The data associated with the planned motion can include data associated with a motion plan 134 determined onboard the vehicle 104 for controlling the vehicle 104 without control from a human user. Additionally, or alternatively, data associated with the planned motion can include data associated with a collision mitigation system 135 (e.g., a vehicle motion determined by the collision mitigation system 135), data indicative of a vehicle route along which the vehicle 104 is to travel, and/or other data.

At (804), the method 800 can include identifying a future vehicle action of the vehicle. For instance, the vehicle computing system 102 can identify a future vehicle action 202, 302, 402 to be performed by the vehicle 104 based at least in part on the data associated with the planned motion. The vehicle computing system 102 can identify a type and/or a timing associated with the future vehicle action 202, 302, 402. For example, the type of future vehicle action 202, 302, 402 can include at least one of a nudge action, a lane change, a turn, an increase in vehicle speed, a decrease in vehicle speed, a stopping action, or a parking action. The nudge action can include, for example, a change in a position of the vehicle 104 within a current travel lane 404. The timing associated with the future vehicle action 202, 302, 402 can be expressed in time and/or distance until which and/or when the vehicle 104 will perform the future vehicle action.

The vehicle computing system 102 can update the timing associated with the future vehicle action (e.g., in real-time and/or near real-time). For example, the timing of the future vehicle action may be affected by one or more aspects of the surrounding environment (e.g., traffic, weather, a cattle crossing, etc.). In some implementations, the vehicle computing system 102 can identify these aspect(s) based at least in part on data acquired onboard the vehicle 104 (e.g., sensor data, perception data, prediction data) and/or off-board the vehicle 104 (e.g., traffic data, weather data, etc.). The vehicle computing system 102 can determine the effect of these aspect(s) on the future vehicle action. By way of example, the vehicle computing system 102 can determine whether the timing of the future vehicle action has decreased and/or increase due to traffic, weather, etc. The vehicle computing system 102 can update the determined timing associated with the future vehicle action based on the effects of the aspects of the surrounding environment. In some implementations, the vehicle computing system 102 can also, or alternatively, update the type of future vehicle action (e.g., from a nudge action to a lane change to avoid traffic).

At (806), the method 800 can include determining an external vehicle indication for the future vehicle action. The vehicle computing system 102 can determine an external vehicle indication 137 that is indicative of the future vehicle action 202, 302, 402 to be performed by the vehicle 104. The external vehicle indication 137 can be indicative of a type of the future vehicle action 202, 302, 402 to be performed by the vehicle 104 and/or a timing associated with the future vehicle action 202, 302, 402. For example, the external vehicle indication 137 can indicate that the vehicle 104 is to perform a nudge action and/or another type of action. The external vehicle indication 137 can be indicative of a distance between a current location of the vehicle 104 and performance of the future vehicle action 202, 302, 402. Additionally, or alternatively, the external vehicle indication 137 can be indicative of a time until the vehicle 104 performs the future vehicle action 202, 302, 402. As described herein, in some implementations, the vehicle computing system 102 can access a data structure stored in a memory onboard the vehicle 104 to determine an external vehicle indication 137 (e.g., activation characteristic(s)) for a particular future vehicle action 202, 302, 402.

At (808), the method 800 can include outputting the external vehicle indication. For example, the vehicle computing system 102 can output, via an output device 138 onboard the vehicle 104, the external vehicle indication 137. The external vehicle indication 137 can be outputted to at least a portion of a surrounding environment of the vehicle 104 (e.g., outputted such that it is visible/hearable from at least a portion of the surrounding environment). For example, the output device 138 can include a display device 602. The external vehicle indication 137 can include a visual indication that is provided via a user interface 604 of the display device 602. Additionally, or alternatively, the output device 138 can include one or more lighting elements 502A-C. The external vehicle indication 137 can include a visual indication that is provided via the one or more lighting elements 502A-C. For example, the timing associated with the future vehicle action 202, 302, 402 can be communicated based at least in part on a frequency with which the one or more lighting elements 502A-C are illuminated, as described herein. The output device 138 can also, or alternatively, include an audio output device, and the external vehicle indication can include auditory indication, as described herein. In some implementations, the vehicle computing system 102 can update the outputted type and/or timing associated with the future vehicle action (e.g., in real-time, near real-time) based at least in part on the effects of the aspects of the surrounding environment, as described herein.

Because of the granularity of the information provided by the external vehicle indication 137 (e.g., the type and timing information), the external vehicle indication 137 can be outputted to the surrounding environment much earlier than normally done for a typical turn signal. For example, since the external vehicle indication 137 can indicate the type of action (e.g., turn) and the timing (e.g., at Main St.), the external vehicle indication 137 can be provided earlier (e.g., several streets ahead of such turn) without confusing the objects proximate to the vehicle 104.

At (810), the method 800 can include causing the vehicle to perform the future vehicle action. The vehicle computing system 102 can cause the vehicle 104 to perform the future vehicle action 202, 302, 402. For instance, the vehicle computing system 102 can implement a motion plan 134 that includes the future vehicle action 202, 302, 402. The vehicle 104 can be caused to perform the future vehicle action 202, 302, 402 via the vehicle control system(s) 116 (e.g., via control signals to the vehicle's control components), as described herein.

At (812), the method 800 can include ceasing output of the external vehicle indication. For example, the vehicle computing system 102 can cease the output of the external vehicle indication 137 upon completion of the future vehicle action 202, 302, 402. The vehicle computing system 102 can provide one or more controls signals to the output device 138 (e.g., an associated controller) to cause the output device 138 to cease outputting the external vehicle indication 137 (e.g., a first external vehicle indication). In some implementations, at (814) the vehicle computing system 102 can output a second external indication 702, as described herein.

Figure 9:
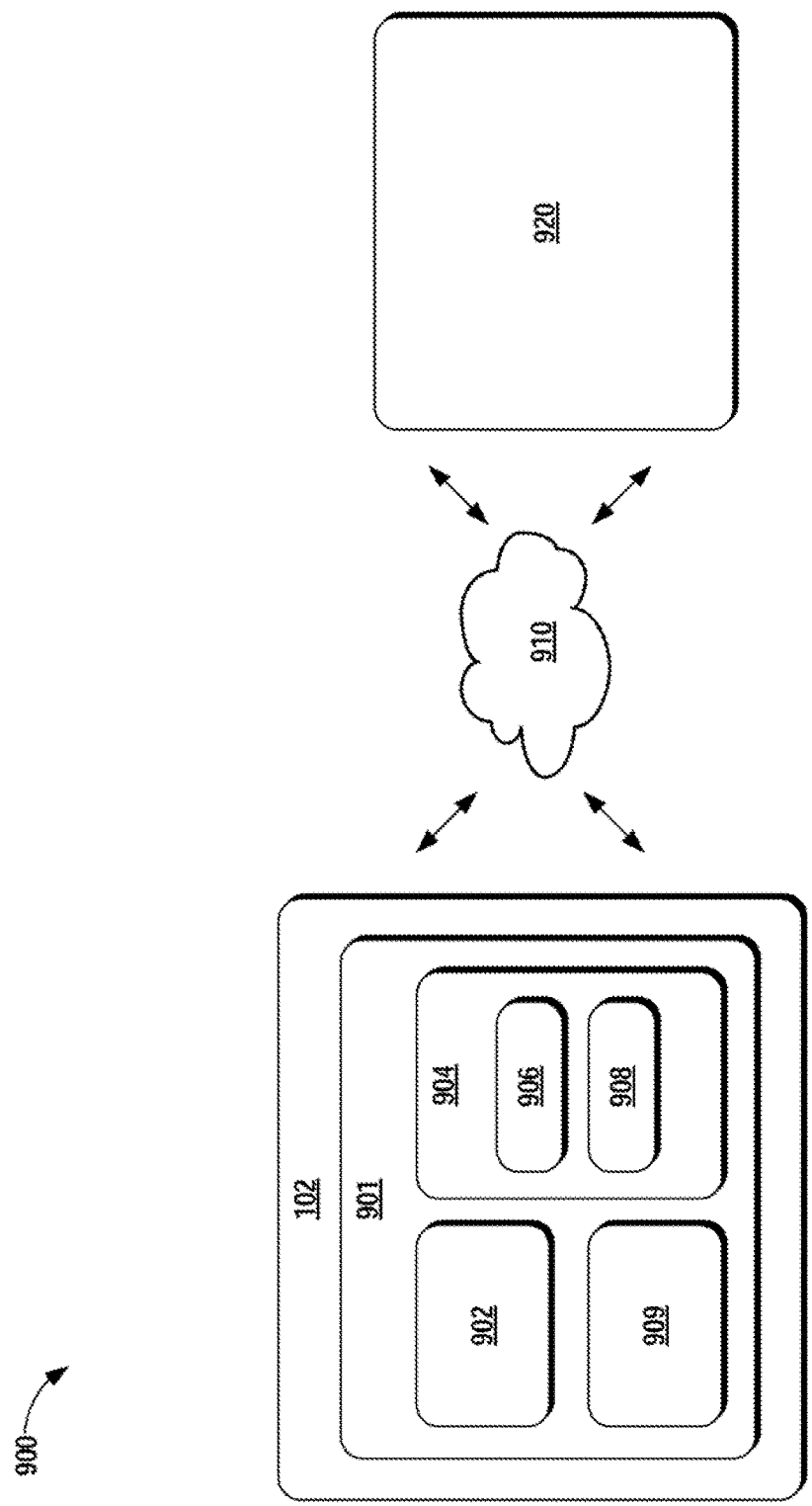
FIG. 9 depicts example system components according to example embodiments of the present disclosure.

FIG. 9 depicts an example system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include the vehicle computing system 102 of the vehicle 104 and a remote computing system 920 (e.g., the operations computing system 106) that can be communicatively coupled to one another over one or more networks 910. The remote computing system 920 can be associated with a central operations system and/or an entity associated with the vehicle 104 such as, for example, a vehicle owner, vehicle manager, fleet operator, service provider, etc.

The computing device(s) 901 of the vehicle computing system 102 can include processor(s) 902 and a memory 904. The one or more processors 902 can be any suitable processing device (e.g., a processor core, a microprocessor, an ASIC, a FPGA, a controller, a microcontroller, etc.) and can be one processor or a plurality of processors that are operatively connected. The memory 904 can include one or more non-transitory computer-readable storage media, such as RAM, ROM, EEPROM, EPROM, one or more memory devices, flash memory devices, data registrar, etc., and combinations thereof.

The memory 904 can store information that can be accessed by the one or more processors 902. For instance, the memory 904 (e.g., one or more non-transitory computer-readable storage mediums, memory devices) on-board the vehicle 104 can include computer-readable instructions 906 that can be executed by the one or more processors 902. The instructions 906 can be software written in any suitable programming language or can be implemented in hardware. Additionally, or alternatively, the instructions 906 can be executed in logically and/or virtually separate threads on processor(s) 902.

For example, the memory 904 on-board the vehicle 104 can store instructions 906 that when executed by the one or more processors 902 on-board the vehicle 104 cause the one or more processors 902 (the vehicle computing system 102) to perform operations such as any of the operations and functions of the vehicle computing system 102, the operations and functions for planning vehicle motion, the operations and functions for communicating future vehicle actions (e.g., one or more portions of method 800), operations and functions for causing a vehicle to perform vehicle actions, and/or any other operations and functions of the vehicle computing system 102, as described herein.

The memory 904 can store data 908 that can be obtained, received, accessed, written, manipulated, created, and/or stored. The data 908 can include, for instance, data associated with an operating mode of the vehicle, data associated with classified objects, data associated with predicted object motion, data associated with a planned motion of a vehicle, data associated with a future vehicle action, a data structure that can be used to determine an external vehicle indication, data associated with an external vehicle indication, and/or other data/information as described herein. In some implementations, the computing device(s) 901 can obtain data from one or more memories that are remote from the vehicle 104.

The computing device(s) 901 can also include a communication interface 909 used to communicate with one or more other system(s) on-board the vehicle 104 and/or a remote computing device that is remote from the vehicle 104 (e.g., of the operations computing system 106). The communication interface 909 can include any circuits, components, software, etc. for communicating via one or more networks (e.g., 910). In some implementations, the communication interface 909 can include, for example, one or more of a communications controller, receiver, transceiver, transmitter, port, conductors, software and/or hardware for communicating data.

The network(s) 910 can be any type of network or combination of networks that allows for communication between devices. In some embodiments, the network(s) 910 can include one or more of a local area network, wide area network, the Internet, secure network, cellular network, mesh network, peer-to-peer communication link and/or some combination thereof and can include any number of wired or wireless links. Communication over the network(s) 910 can be accomplished, for instance, via a communication interface using any type of protocol, protection scheme, encoding, format, packaging, etc.

The remote computing system 920 can include one or more remote computing devices that are remote from the vehicle computing system 102. The remote computing devices can include components (e.g., processor(s), memory, instructions, data) similar to that described herein for the computing device(s) 901. Moreover, the remote computing system 920 can be configured to perform one or more operations of the operations computing system 106, as described herein.

Computing tasks discussed herein as being performed at computing device(s) remote from the vehicle can instead be performed at the vehicle (e.g., via the vehicle computing system), or vice versa. Moreover, computing tasks discussed herein as being performed by the operations computing system can be performed by another computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for communicating future autonomous vehicle actions, comprising:

obtaining, by a computing system comprising one or more computing devices onboard an autonomous vehicle, data associated with a planned motion of the autonomous vehicle;

identifying, by the computing system, a future vehicle action to be performed by the autonomous vehicle based at least in part on the data associated with the planned motion;

determining, by the computing system, an external vehicle indication that is indicative of the future vehicle action to be performed by the autonomous vehicle, wherein the external vehicle indication is indicative of a type of the future vehicle action to be performed by the autonomous vehicle, a geographic location at which the future vehicle action is to be performed, and an amount of time until the future vehicle action is to be performed; and outputting, by the computing system via an output device onboard the autonomous vehicle, the external vehicle indication indicative of the type of the future vehicle action to be performed by the autonomous vehicle, the geographic location at which the future vehicle action is to be performed, and the amount of time until the future vehicle action is to be performed, wherein the external vehicle indication is outputted to at least a portion of a surrounding environment of the autonomous vehicle, wherein the output device comprises a display screen that is located on an exterior of the autonomous vehicle and that displays the external vehicle indication.

2. The computer-implemented method of claim 1, wherein the data associated with the planned motion comprises data associated with a motion plan determined onboard the autonomous vehicle for controlling the autonomous vehicle without control from a human user.

3. The computer-implemented method of claim 1, wherein the external vehicle indication is indicative of a distance between a current location of the autonomous vehicle and performance of the future vehicle action.

4. The computer-implemented method of claim 1, wherein the external vehicle indication is indicative of a time until the autonomous vehicle performs the future vehicle action.

5. The computer-implemented method of claim 1, wherein the external vehicle indication comprises a visual indication that is provided via a user interface of the display device.

6. The computer-implemented method of claim 1, wherein the autonomous vehicle is operating in a fully autonomous operating mode in which the autonomous vehicle is controllable without user input.

7. The computer-implemented method of claim 1, wherein the output device further comprises one or more lighting elements, and wherein the external vehicle indication comprises a visual indication that is provided via the one or more lighting elements.

8. The computer-implemented method of claim 1, wherein the timing associated with the future vehicle action is communicated based at least in part on a frequency with which the external vehicle indication is displayed.

9. The computer-implemented method of claim 1, wherein the type of future vehicle action comprises at least one of a nudge action, a lane change, a turn, an increase in vehicle speed, a decrease in vehicle speed, a stopping action, or a parking action.

10. The computer-implemented method of claim 9, wherein the nudge action comprises a change in a position of the autonomous vehicle within a current travel lane.

11. The computer-implemented method of claim 1, further comprising:
  causing, by the computing system, the autonomous vehicle to perform the future vehicle action; and
  ceasing, by the computing system, the output of the external vehicle indication upon completion of the future vehicle action.

12. A computing system for communicating future autonomous vehicle actions, comprising:
  one or more processors; and
  one or more memory devices, the one or more memory devices storing instructions that when executed by the one or more processors cause the computing system to perform operations, the operations comprising:
  obtaining data associated with a planned motion of the autonomous vehicle;
  identifying a future vehicle action to be performed by the autonomous vehicle based at least in part on the data associated with the planned motion;
  determining an external vehicle indication that is indicative of the future vehicle action to be performed by the autonomous vehicle, wherein the external vehicle indication is indicative of a type of the future vehicle action to be performed by the autonomous vehicle, a geographic location at which the future vehicle action is to be performed, and an amount of time until the future vehicle action is to be performed; and
  outputting, by the computing system via an output device that comprises a display screen located on an exterior of the autonomous vehicle, an external vehicle indication that is indicative of the future vehicle action, wherein the external vehicle indication is indicative of the type of the future vehicle action to be performed by the autonomous vehicle, the geographic location at which the future vehicle action is to be performed, and the amount of time until the future vehicle action is to be performed, and wherein the external vehicle action is displayed on the display screen.

13. The computing system of claim 12, wherein the data associated with the planned motion of the autonomous vehicle is generated onboard the autonomous vehicle.

14. The computing system of claim 12, wherein the future vehicle action is to control a motion of the autonomous vehicle without user input to the autonomous vehicle.

15. The computing system of claim 12, wherein the future vehicle action is associated with a vehicle action determined by a collision mitigation system of the autonomous vehicle to avoid a potential collision.

16. The computing system of claim 12, wherein the output device further comprises an audio output device, and wherein the external vehicle indication comprises an auditory indication.

17. The computing system of claim 12, wherein the external vehicle indication is a first external vehicle indication, wherein the operations further comprise:
  causing the autonomous vehicle to perform the future vehicle action; and
  outputting, via the output device onboard the autonomous vehicle, a second external vehicle indication.

18. An autonomous vehicle, comprising:
  one or more output devices comprising a display screen;
  one or more processors; and
  one or more memory devices storing instructions that when executed by the one or more processors cause the autonomous vehicle to perform operations, the operations comprising:
  obtaining data associated with a planned motion of the autonomous vehicle;
  identifying a future vehicle action to be performed by the autonomous vehicle based at least in part on the data associated with the planned motion;
  determining an external vehicle indication that is indicative of a status of the future vehicle action, wherein the external vehicle indication is indicative of a type of the future vehicle action to be performed by the autonomous vehicle, a geographic location at which the future vehicle action is to be performed, and an amount of time until the future vehicle action is to be performed; and
  outputting, via the one or more output devices, the external vehicle indication indicative of the type of the future vehicle action to be performed by the autonomous vehicle, the geographic location at which the future vehicle action is to be performed, and the amount of time until the future vehicle action is to be performed, wherein the external vehicle indication is outputted via the display screen to at least a portion of a surrounding environment of the autonomous vehicle.

19. The autonomous vehicle of claim 18, wherein the display screen is located on an exterior of the autonomous vehicle.

* * * * *